United States Patent

Pfeifer

[11] 4,429,110
[45] Jan. 31, 1984

[54] TRANSPARENT POLYAMIDE FROM BRANCHED CHAIN ARYLALKYL DIAMINE

[75] Inventor: Josef Pfeifer, Therwil, Switzerland

[73] Assignee: Ciba-Geigy Corporation, Ardsley, N.Y.

[21] Appl. No.: 387,119

[22] Filed: Jun. 10, 1982

[30] Foreign Application Priority Data

Jun. 19, 1981 [GB] United Kingdom ............ 8119012

[51] Int. Cl.³ .......................................... C08G 69/26
[52] U.S. Cl. .................................. 528/348; 528/338; 528/339; 528/340; 528/349
[58] Field of Search .............. 528/349, 348, 338, 339, 528/340

[56] References Cited

U.S. PATENT DOCUMENTS 3,776,890 12/1973 Lee .................................. 260/78 R
4,024,185 5/1977 Lee .................................. 260/563 R
4,130,579 12/1978 Frazer et al. ...................... 260/465

OTHER PUBLICATIONS

L. T. C. Lee, J. Polymer Science, Poly. Sci. Ed., 16, 2025 (1978).

Primary Examiner—Harold D. Anderson
Attorney, Agent, or Firm—Luther A. R. Hall

[57] ABSTRACT

New transparent polyamides consisting of recurring structural elements of formula I or II

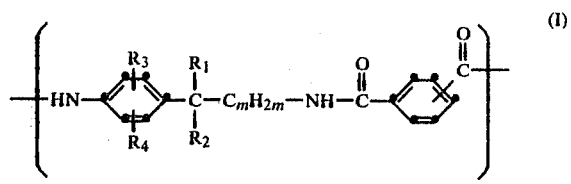

or

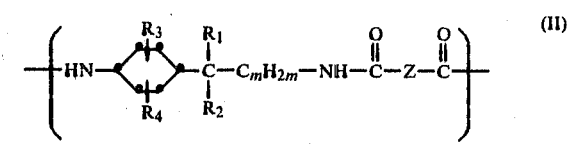

in which the carbonyl groups are linked to the benzene ring in 1,3- and/or 1,4-position are described. The novel polyamides are suitable for the manufacture of transparent shaped articles, and are distinguished by good thermoplastic processing characteristics, low water absorption, high stability to hydrolysis and good dimensional stability under the action of moisture.

8 Claims, No Drawings

TRANSPARENT POLYAMIDE FROM BRANCHED CHAIN ARYLALKYL DIAMINE

This invention relates to new transparent polyamides, processes for producing them and their use for the manufacture of shaped articles.

U.S. Pat. Nos. 3,776,890 and 4,024,185 disclose polyamides from 2-(4-aminocyclohexyl)-1,1-dimethylethylamine or 2-(4-aminophenyl)-1,1-dimethylethylamine and aliphatic, aromatic or aliphatic-aromatic dicarboxylic acids or amide-forming derivatives thereof. These polyamides are part crystalline. They absorb considerable amounts of water and are not wholly satisfactory with regard to stability to hydrolysis and/or dimensional stability under the action of moisture, in consequence of which also the mechanical and electrical properties of these polyamides are impaired. Furthermore, the glass transition temperatures of these polyamides are greatly dependent on moisture, and polyamides from the aforementioned diamines and aromatic dicarboxylic acids or amide-forming derivatives thereof cannot be processed from the melt [cp. also Journal of Polymer Science: Polymer Chemistry Edition, vol. 16, 2025-2038 (1978)].

The present invention provides new transparent polyamides which are distinguished by improved thermoplastic processing characteristics, are resistant to boiling water, and which further have a low water absorption, high stability to hydrolysis, good dimensional stability under the action of moisture, and correspondingly improved mechanical and electrical properties.

The novel polyamides according to the invention have a reduced specific viscosity (in the following referred to also as reduced solution viscosity) of at least 0.3 dl/g, preferably about 0.5 to about 2.0 dl/g, and particularly about 0.7 to about 1.8 dl/g, /measured on a 0.5% solution in m-cresol at 25° C., and having recurring structural elements of formula I or II

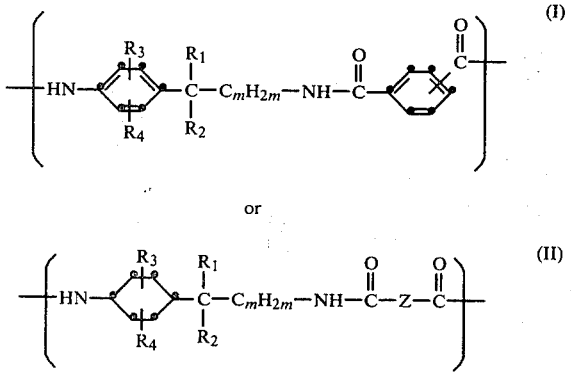

wherein
m is an integer of from 4 to 16,
$R_1$ is $C_{1-3}$ alkyl
$R_2$ is $C_{1-6}$ alkyl,
$R_3$ and $R_4$ independently of each other are hydrogen or $C_{1-3}$ alkyl, and Z is 1,3- and/or 1,4-phenylene which, in up to 50 mole %, preferably up to 45 mole %, of the structural elements of formula II may be replaced by groups $-(CH_2)_n-$ wherein n is an integer of from 4 to 10 and whereby the carbonyl groups in the structural elements of formula I are linked to the benzene ring in 1,3- and/or 1,4-position.

Alkyl groups $R_1$, $R_2$, $R_3$ and $R_4$ may be straight or branched-chain. Examples of alkyl groups $R_1$ to $R_4$ are the methyl, ethyl, n-propyl, isopropyl, n-butyl, sec-butyl, n-pentyl and n-hexyl group. $R_1$ preferably represents methyl or ethyl. Preferred groups $R_2$ are alkyl groups having 1-4 carbon atoms, more particularly, methyl, ethyl or isopropyl. $R_3$ and $R_4$ are preferably methyl and especially hydrogen.

Groups $-C_mH_{2m}-$ may also be straight or branched-chain, the branching preferably being not vicinal to the group $-C(R_1)(R_2)-$. Examples of groups $-C_mH_{2m}-$ or $-C_nH_{2n}-$ are the tetramethylene, 4-methyltetramethylene, pentamethylene, 2,2-dimethylpentamethylene, hexamethylene, heptamethylene, octamethylene, nonamethylene, 9-methylnonamethylene, 9-ethylnonamethylene, 9-isopropylnonamethylene, 9-n-butylnonamethylene, 9-n-hexylnonamethylene, decamethylene, 10-methyldecamethylene, 10-ethyldecamethylene 10-isopropyldecamethylene, 10-n-butyldecamethylene, 10-n-hexyldecamethylene, undecamethylene, dodecamethylene, tridecamethylene, tetradecamethylene, pentadecamethylene and hexadecamethylene group. Preferred groups $-C_mH_{2m}-$ are those of formulae $-(CH_2)_3-CH(CH_3)-$ $-(CH_2)_8-CH(R_5)-$ and $-(CH_2)_9-CH(R_5)-$ wherein the $-CH-$ group is bonded to the nitrogen atom and $R_5$ represents straight or branched-chain alkyl having 1-6 carbon atoms, preferably isopropyl.

Preferred groups Z are $-(CH_2)_4-$, the 1,3- and/or 1,4-phenylene group.

Preferred polyamides are those consisting of recurring structural elements of formula I or II wherein $R_1$ is methyl or ethyl, $R_2$ is $C_{1-4}$ alkyl, especially methyl, ethyl or isopropyl, $R_3$ and $R_4$ independently of one another are methyl or hydrogen, $-C_mH_{2m}-$ is $-(CH_2)_3-CH(CH_3)-$, $-(CH_2)_8-CH(R_5)-$ or $(CH_2)_9-CH(R_5)-$ wherein the group $-CH-$ is linked to the nitrogen atom and $R_5$ is $C_{1-4}$ alkyl, especially isopropyl and Z is 1,3- or 1,4-phenylene which, in up to 45 mole % of the structural elements of formula II, may be replaced by $-(CH_2)_n-$ wherein n is an integer of from 4 to 10, the carbonyl groups in the structural elements of formula I being linked to the benzene ring either in 1,3- or in 1,4-position.

Particularly preferred are polyamides consisting of recurring structural elements of formula I or II wherein $R_1$ is methyl, $R_2$ is methyl or ethyl, $R_3$ and $R_4$ are each hydrogen, $-C_mH_{2m}-$ is $-(CH_2)_3-CH(CH_3)-$ or

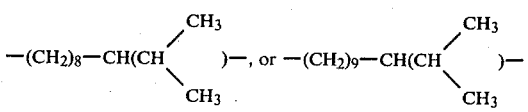

the group $-CH-$ being linked to the nitrogen atom, Z is 1,3-phenylene, 1,4-phenylene or 1,4-phenylene which, in 15 to 45 mole% of the structural elements of formula II is replaced by $-(CH_2)_4-$, the carbonyl groups in the structural elements of formula I being linked to the benzene ring either in 1,3- or in 1,4-position. In such polyamides Z most preferably is 1,3-phenylene and especially 1,4-phenylene.

The polyamides according to the invention can be produced by melt-polycondensation of
(a) a diamine of formula III

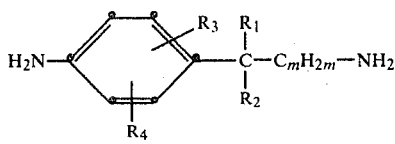

with an activated ester of isophthalic and/or terephthalic acid, or (b) a diamine of formula IV

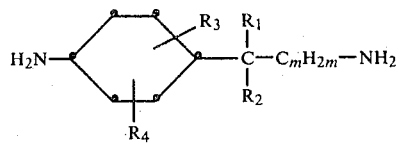

with an activated ester of isophthalic and/or terephthalic acid, or a mixture of said activated esters of isophthalic and/or terephthalic acid and up to 50 mole % of an activated ester of a dicarboxylic acid of formula V $$HOOC-(CH_2)_n-COOH \quad (V).$$

In the above formulae III to V $R_1$ to $R_4$, m and n have the meanings given under formulae I and II. Suitable activated esters are in particular the corresponding diphenylesters. The reaction temperatures are generally between about 230° and 300° C. The reactants are preferably employed in substantially stochiometric amounts. This process is especially suitable for the preparation of polyamides consisting of recurring structural elements of formula I.

The polyamides according to the invention can also be produced, in a manner known per se, by interfacial surface polycondensation of diamines of formula III and IV, respectively, with isophthalic and/or terephthalic acid dihalides, optionally in admixture with up to 50 mole % of dihalides of dicarboxylic acids of formula V. Preferably, the corresponding dichlorides are used in this process.

Polyamides consisting of recurring structural elements of formula II are preferably produced by reacting a diamine of formula IV with isophthalic and/or terephthalic acid or amide-forming derivatives thereof, or a mixture of said isophthalic and/or terephthalic acid or amide-forming derivatives thereof with up to 50 mole % of a dicarboxylic acid of formula V or an amide-forming derivative thereof.

Suitable amide-forming derivatives of isophthalic acid, terephthalic acid or dicarboxylic acids of formula V are, e.g., the corresponding dinitriles or dialkylesters having 1 to 4 carbon atoms in each of the alkyl groups.

For the above process melt-polycondensation in several stages is preferred. The diamines of formula IV in this case are pre-condensed with essentially stoichiometric amounts of the dicarboxylic acids as defined, in a closed vessel, optionally with the addition of water, under an inert gas such as nitrogen, and at temperatures of between about 240° and 290° C. It can be advantageous under certain circumstances to use the diamines and the dicarboxylic acids as salts. The salts to be used for pre-condensation are produced from essentially stoichiometric amounts of isophthalic acid and/or terephthalic acid and, optionally, up to 50 mole % of a dicarboxylic acid of formula V, and diamine of formula IV in a suitable inert organic solvent. Suitable inert organic solvents are for example: cycloaliphatic alcohols, such as cyclopentanol and cyclohexanol, and especially aliphatic alcohols having up to 6 carbon atoms, such as methanol, ethanol, n-propanol, butanols, pentanols and hexanols, and also mixtures of such solvents with water. The pre-condensate can be subsequently further condensed at about 220° and 300° C. under normal pressure, and advantageously likewise in an inert-gas atmosphere, until the polyamides have been formed. It can be of advantage under certain circumstances to apply a vacuum after completion of the polycondensation in order to degas the polyamide.

Customary additives, such as heat and light stabilizers, antioxidants, dyes, flameproofing agents, and the like, can be added to the polyamides according to the invention, either during production or during processing.

The diamines of formula III and IV are novel. Diamines of formula III can be prepared by reacting an aromatic diamine of formula VI

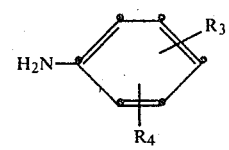

wherein $R_3$ and $R_4$ have their previous significance, and the para-position relative to the amino group is unsubstituted, with an alkylating agent VII which is capable of introducing the residue $-C(R_1)(R_2)-C_mH_{2m}-NH_2$ in para-position to the amino group, the reaction being effected in an acid medium and at an elevated temperature, e.g. at a temperature in the range of from 30° to 250° C., preferably 100° to 190° C. The reaction is preferably effected in the presence of a metal salt, as co-catalyst, and optionally at super-atmospheric pressure. Suitable co-catalysts are, e.g., halides, oxides, hydroxides or carbonates of metals belonging to group II, III or VIII of the periodic table. Such metals are preferably Mg, Cd, Zn, Al, Fe, Co and Ni.

Preferred alkylating agents are aminoalcohols and diamines capable of introducing the radical $-C(R_1)(R_2)-C_mH_{2m}-NH_2$, or salts thereof.

Suitable acids for effecting the alkylating reaction are hydrochloric acid, sulphuric and orthophosphoric acids, alkyl-, aryl- or alkaryl-substituted inorganic acids such as methane- or ethane-sulphonic acids, benzene sulphonic acid, p-toluene sulphonic acid and methane sulphonic acid, dichloro-acetic acid, trichloroacetic acid and trifluoroacetic acid, hydrochloric acid being preferred.

After completion of the alkylation the diamines of formula III can be purified and isolated in a conventional manner. The aromatic diamines of formula III thus obtained are then hydrogenated in the presence of a metal- or mixed metal catalyst, and in the presence of a solvent which is inert to hydrogen under the reaction conditions, to give diamines of formula IV. Suitable solvents for the hydrogenation reaction are, e.g., alcohols, carboxylic acids or aqueous inorganic acids, acetic acid and hydrochloric acid being preferably suitable. Group VIII metals of the periodic system of elements, e.g., Rh and Pt, or mixtures thereof, are suitable as hydrogenation catalysts. More preferred is Rh/Al$_2$O$_3$ when using tert-butanol as solvent, and especially preferred is a mixture Rh$_2$O$_3$-PtO$_2$ (Nishimura catalyst) when using hydrochloric acid as solvent.

The polyamides according to the invention can be processed, by methods known per se, into shaped articles of the widest variety, for example by the injection-moulding process or extrusion process. They are suitable in particular for producing transparent apparatus or parts of apparatus from the melt.

In the following Examples, parts are parts by weight, unless otherwise indicated. Pressures are given in millibars.

EXAMPLES (A) Preparation of Diamines of Formula III and IV

EXAMPLE I

To a solution of 102 parts of anhydrous zinc chloride in 153 parts of 36% w/w aqueous hydrochloric acid and 200 parts of water are added 140 parts of aniline and 136 parts of 6-hydroxy-6-methyl-2-heptylamine hydrochloride (heptaminol hydrochloride). The whole is charged to a 1 liter tantalum-lined autoclave and stirred at 185° C. for 24 hours. The reaction mixture, after being discharged from the autoclave, is added to a hot solution of 750 parts sodium hydroxide in 1500 parts of water and stirred until cool. The organic phase is extracted with diethylether, washed with water, evaporated and distilled under reduced pressure. After recovering 58 parts of aniline there are obtained 135 parts of 2-amino-6-(4-amino-phenyl)-6-methyl-heptane boiling point 138°-40° C./65 Pa (82% yield based on heptaminol).

EXAMPLE II 123 parts of aniline and 84 parts of 3-amino-2,2,12-trimethyltridecan-13-ol are dissolved in a solution comprising 166 parts of 36% w/w aqueous hydrochloric acid, 89 parts anhydrous zinc chloride and 130 parts of water. This solution is then stirred at 180° C. for 90 hours in a 1 liter tantalum autoclave and then worked up as in Example 1 after pouring the reaction mixture into 250 parts of sodium hydroxide in 500 parts of water. Distillation under reduced pressure gives 85 parts of a first fraction which consists mainly of aniline. This is followed by a mixture of 62 parts of 3-amino-12-(4-aminophenyl)-2,12-dimethyl-tetradecane and 3-amino-13-(4-aminophenyl)2,13-dimethyl-tetradecane; boiling point 184°-8° C. at 0.1 mb (57% yield based on the aminotridecanol).

EXAMPLE III 5.0 parts of 2-amino-6-(4-aminophenyl)-6-methyl-heptane dissolved in 68 parts of 1 N aqueous hydrochloric acid are shaken at room temperature (20°-25° C.) and atmospheric pressure with hydrogen in the presence of 0.5 parts of Nishimura catalyst (rhodium-platinum oxides). Hydrogen uptake ceases at 105% of theory and the solution is filtered free of catalyst and treated with sodium hydroxide solution to give an oil which is isolated with diethylether. After removing the diethylether, the residue is distilled to give 4.0 parts of cis- and trans-2-amino-6-(4-aminocyclohexyl)-6-methyl-heptane; boiling point 120°-9° C. at 0.3 mbar.

EXAMPLES IV AND V

In an analogous manner to that described in Example I, using instead of aniline equivalent amounts of o-toluidine or 2-ethylaniline the following diamines are obtained:

| Example | Aromatic Amine | Diamines | boiling point °C./ pressure | Molecular Formula | Found & Required % Composition C | H | N |
|---|---|---|---|---|---|---|---|
| IV | o-toluidine | 2-amino-6-(4-amino-3-methylphenyl)-6-methyl-heptane | 192-6 13 mbar | C$_{15}$H$_{26}$N$_2$ | 76.87 76.56 | 11.18 11.49 | 11.95 12.25 |
| V | 2-ethyl-aniline | 2-amino-6-(4-amino-3-ethylphenyl)-6-methyl-heptane | 188-94 13 mbar | C$_{16}$H$_{28}$N$_2$ | 77.36 77.36 | 11.78 11.36 | 10.96 11.28 |

EXAMPLE VI

10 Parts of 2-amino-6-(4-amino-3,5-dimethylphenyl)-6-methylheptane, 90 parts of glacial acetic acid, 8.2 parts of 36% w/w hydrochloric acid and 1.0 part of Nishimura catalyst were charged to a glass pressure bottle. The mixture was shaken at 80° C. with hydrogen at a pressure of 4 bar, and the uptake of hydrogen stopped at 100% of theory after 1.25 hours. After removal of the catalyst by filtration the solution was poured into 200 parts of ice and the pH of the solution then adjusted to 13. The organic phase was ether extracted, evaporated and distilled to give 1,5 part of a fore-run, followed by 5.4 parts of 2-amino-6-(4-amino-3,5-dimethylcyclohexyl)-6-methylheptane with a boiling point of 84°-7° C. at 0.05 mbar with the following percentage composition by weight.

| | Carbon | Hydrogen | Nitrogen |
|---|---|---|---|
| Found | 75.2 | 13.5 | 10.9 |
| calculated for C$_{16}$H$_{34}$N$_2$ | 75.52 | 13.47 | 11.01 |

EXAMPLE VII

2-Amino-6-(4-amino-3-methylcyclohexyl)-6-methyl-heptane, boiling point 170°-2° C. at 16 mbar was prepared from 2-amino-6-(4-amino-3-methylphenyl)-6-methyl-heptane by hydrogenation over Nishimura catalyst according to the procedure of Example VI and had the following percentage composition by weight.

| | Carbon | Hydrogen | Nitrogen |
|---|---|---|---|
| Found | 75.03 | 13.26 | 11.33% |
| Calculated for C$_{15}$H$_{32}$N$_2$ | 74.93 | 13.42 | 11.65% |

EXAMPLE VIII 10.0 Parts of 2-amino-6-(4-amino-3-ethylphenyl)-6-methylheptane in 120 parts of 1 N aqueous hydrochloric acid were shaken with hydrogen at room temperature and atmospheric pressure with 1.0 parts Nishimura catalyst. After 46% of theory hydrogen had been taken up in 8 hours a further 1.0 parts of catalyst was added and 96% of theory hydrogen uptake was reached in the next 15 hours. The hydrogenation which ceased at 110% theory during the next 24 hours following a final 1.0 part catalyst addition, was worked up according to Example VI, and gave on distillation 8.8 parts of 2-amino-6-(4-amino-3-ethylcyclohexyl)-6-methylheptane, boiling point 176°–80° C. at 12 mbar with the following percentage composition by weight.

|  | Carbon | Hydrogen | Nitrogen |
|---|---|---|---|
| Found | 75.38 | 13.74 | 11.11% |
| Calculated for $C_{16}H_{34}N_2$ | 75.52 | 13.47 | 11.01% |

(B) Preparation of Polyamides

EXAMPLE 1

19.36 g (0.0878 moles) of 2-amino-6-(4-aminophenyl)-6-methylheptane and 27.97 g (0.0878 moles) of isophthalic acid diphenylester are weighed into a 200 ml round flask fitted with reflux condenser and gas inlet. After the air in the flask has been completely expelled by nitrogen, the flask is immersed in a salt bath the temperature of which is 210° C. The flask is kept at this temperature for three hours while passing through a light stream of nitrogen. The reflux condenser is then replaced by a distillation bridge fitted with a receiving flask, and the temperature is raised to 270° C. in the course of one hour. The greater part of the phenol formed distills over into the receiving flask. Water pump vacuum is then applied (about 2000 Pa), and the residual phenol is distilled off at 270° C. during three hours. A viscous polyamide melt is obtained which on cooling, solidifies into a yellowish transparent mass. 2 to 3 g of the polyamide thus obtained are then moulded into an about 0.3 to 0.5 mm thick sheet, by means of a heatable hydraulic press. The sheet is exposed at room temperature to a relative humidty of 65% until no further increase in weight can be detected.

The reduced solution viscosity of the polyamide obtained is measured on a 0.5% solution in m-cresol at 25° C.; its glass transition temperature is determined in a differential calorimeter (DSC). The results are summarized in Table I.

EXAMPLES 2 TO 4

In an analogous manner to that described in Example 1, equimolar amounts of the following reactants are polycondensed to give transparent polyamides:
Example 2: 2-amino-6-(4-aminophenyl)-6-methyl-heptane and terephthalic acid diphenylester;
Example 3: 3-amino-12-(4-aminophenyl)-2,12-dimethyl-tetradecane and 3-amino-13-(4-aminophenyl)-2,13-dimethyl-tetradecane terephthalic acid diphenylester;
Example 4: 3-amino-12-(4-aminophenyl)-2,12-dimethyl-tetradecane and 3-amino-13-(4-aminophenyl)-2,13-dimethyl-tetradecane isophthalic acid diphenylester.

The properties of the polyamides obtained are determined as described in Example 1 and are summarized in Table 1.

EXAMPLE 5

5.66 g (0.025 moles) of 2-amino-6-(4-aminocyclohexyl)-6-methylheptane and 4.155 g (0.025 moles) of isophthalic acid are weighed into a bomb tube fitted with a screw cover and with an incorporated pressure relief valve.

After the air in the bomb has been completely expelled by nitrogen, the bomb tube is closed. It is then immersed into a salt bath having a temperature of 270° C. A clear melt has formed after a short time. After two hours the reaction is interrupted by removing the tube from the salt bath and releasing the excess pressure by opening the valve. The pre-condensate, which has solidified, is removed from the tube and transferred to a condensation vessel. With the strict exclusion of air and the continuous passing through of nitrogen, the mass, which has melted again, is polycondensed at 280° C. The water which forms during the polycondensation is continuously removed by the flow of nitrogen. After 5 hours the polycondensation is interrupted. On cooling, the melt solidifies into a transparent colourless mass. The properties of the polyamide obtained are determined as described in Example 1 and are summarized in Table 1.

EXAMPLES 6 TO 9

In a manner analogous to that described in Example 5 equimolar amounts of the following reactants are polycondensed:
Example 6: 2-amino-6-(4-aminocyclohexyl)-6-methylheptane and terephthalic acid;
Example 7: 2-amino-6-(4-aminocyclohexyl)-6-methylheptane and terephthalic acid/adipic acid in a molar ratio of 70:30;
Example 8: 2-amino-6-(4-aminocyclohexyl)-6-methylheptane and terephthalic acid/adipic acid in a molar ratio of 85:15;
Example 9: 2-amino-6-(4-aminocyclohexyl)-6-methylheptane and terephthalic acid/adipic acid in a molar ratio of 55:45.

The properties of the polyamides obtained are determined as described in Example 1 and are summarized in Table I.

TABLE 1

| Example No. | reduced solution viscosity $\eta$ red dl/g | glass transition temperature Tg °C. | water absorption 65% rel. humidity wt. % |
|---|---|---|---|
| 1 | 0.51 | 159 | 2–3 |
| 2 | 0,38 | 172 | 2–3 |
| 3 | 0.57 | 152 | 1–2 |
| 4 | 0.44 | 135 | 1–2 |
| 5 | 1.39 | 174 | 2–3 |
| 6 | 1.62 | 189 | 2–3 |
| 7 | 0.79 | 155 | 2–3 |
| 8 | 0.78 | 163 | 2–3 |
| 9 | 0.76 | 145 | 2–3 |

EXAMPLES 10 AND 11

In an analogous manner to that described in Example 1, equimolar amounts of the following reactants are polycondensed to give transparent polyamides:
Example 10: 2-Amino-6-(3-methyl-4-aminophenyl)-6-methylheptane and terephthalic acid diphenylester;
Example 11: 2-Amino-6-(3-ethyl-4-aminophenyl)-6-methylheptane and terephthalic acid diphenylester.

EXAMPLES 12 TO 17

In an analogous manner to that described in Example 5, equimolar amounts of the following reactants are polycondensed to give transparent polyamides:
Example 12: 2-Amino-6-(3,5-dimethyl-4-aminocyclohexyl)-6-methylheptane and terephthalic acid;
Example 13: 2-Amino-6-(3,5-dimethyl-4-aminocyclohexyl)-6-methylheptane and isophthalic acid;

Example 14: 2-Amino-6-(3-methyl-4-aminocyclohexyl)-6-methylheptane and terephthalic acid;

Example 15: 2-Amino-6-(3-methyl-4-aminocyclohexyl)-6-methylheptane and isophthalic acid;

Example 16: 2-Amino-6-(3-ethyl-4-aminocyclohexyl)-6-methylheptane and terephthalic acid;

Example 17: 2-Amino-6-(3-ethyl-4-aminocyclohexyl)-6-methylheptane and isophthalic acid.

The properties of the polyamides obtained according to Examples 10 to 17 are determined as described in Example 1 and are summarized in Table II

TABLE II

| Example No. | reduced solution viscosity $\eta$ red dl/g | glass transition temperature Tg °C. | water absorption 65% rel. humidity wt. % |
|---|---|---|---|
| 10 | 0.52 | 170 | 1.8 |
| 11 | 0.40 | 160 | 1.8 |
| 12 | 0.62 | 193 | 1.8 |
| 13 | 0.50 | 178 | 2.0 |
| 14 | 0.50 | 183 | 2.1 |
| 15 | 0.42 | 163 | 2.2 |
| 16 | 0.52 | 178 | 1.8 |
| 17 | 0.41 | 165 | 1.9 |

What is claimed is:

1. A transparent polyamide having a reduced specific viscosity of at least 0.3 dl/g, measured on a 0.5% solution in m-cresol at 25° C., and having recurring structural elements of formula I or II

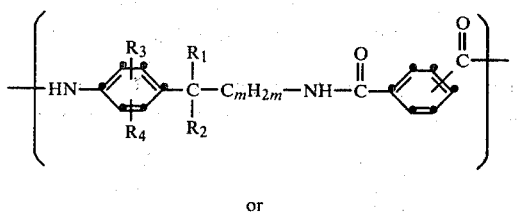

or

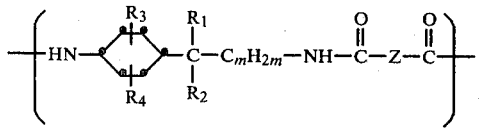

wherein

—$C_mH_{2m}$— is a straight or branched chain alkylene where m is an integer of from 4 to 16, $R_1$ is $C_{1-3}$ alkyl, $R_2$ is $C_{1-6}$ alkyl, $R_3$ and $R_4$ independently of each other are hydrogen or $C_{1-3}$ alkyl, and Z is 50 to 100 mole percent 1,3-phenylene, 1,4-phenylene, or mixture thereof, and 0 to 50 mole percent —$(CH_2)_n$— wherein n is an integer of from 4 to 10, and whereby the carbonyl groups in the structural elements of formula I are linked to the benzene ring in the 1,3-position, 1,4-position or in mixture thereof.

2. A polyamide according to claim 1 having recurring structural elements of formula I or II wherein $R_1$ is methyl or ethyl, $R_2$ is $C_{1-4}$ alkyl, $R_3$ and $R_4$ independently of one another are methyl or hydrogen, —$C_mH_{2m}$— is —$(CH_2)_3$—$CH(CH_3)$—, —$(CH_2)_8$—$CH(R_5)$— or —$(CH_2)_9CH(R_5)$— wherein the group —CH— is linked to the nitrogen atom and $R_5$ is $C_{1-4}$ alkyl, and Z is 55 to 100 mole percent 1,3-phenylene or 1,4-phenylene, and 0 to 45 mole percent —$(CH_2)_n$— wherein n is an integer of from 4 to 10, the carbonyl groups in the structural elements of formula I being linked to the benzene ring either in the 1,3- or in the 1,4-position.

3. A polyamide according to claim 1 having recurring structural elements of formula I or II wherein $R_1$ is methyl, $R_2$ is methyl or ethyl, $R_3$ and $R_4$ are each hydrogen, —$C_mH_{2m}$— is —$(CH_2)_3$—$CH(CH_3)$— or

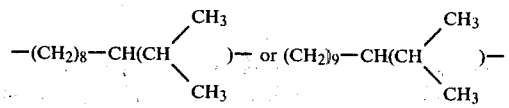

the group —CH— being linked to the nitrogen atom, and Z is 1,3-phenylene or 1,4-phenylene; or Z is 55 to 85 mole percent 1,4-phenylene and 15 to 45 mole percent —$(CH_2)_4$—, the carbonyl groups in the structural elements of formula I being linked to the benzene ring either in the 1,3- or in the 1,4-position.

4. A polyamide according to claim 3 wherein Z is 1,3-phenylene or 1,4-phenylene.

5. A polyamide according to claim 4 wherein Z is 1,4-phenylene.

6. A process for producing a transparent polyamide according to claim 1 which is characterized in that (a) a diamine of formula III

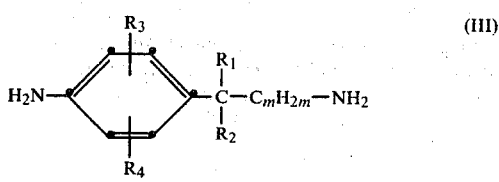

is polycondensed in the melt with an activated ester of isophthalic acid, terephthalic acid or mixture thereof; or (b) a diamine of formula IV

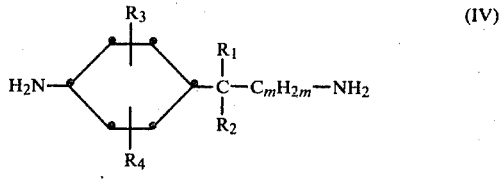

is polycondensed in the melt with 50 to 100 mole percent of an activated ester of isophthalic acid, terephthalic acid or mixture thereof, and 0 to 50 mole percent of an activated ester of a dicarboxylic acid of formula V HOOC—$(CH_2)_n$COOH (V)

wherein $R_1$ to $R_4$, m and n have the meanings given in claim 1.

7. A process for producing a transparent polyamide according to claim 1 having recurring structural elements of formula II which is characterized in that a diamine of formula IV

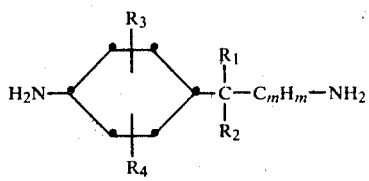

is reacted with 50 to 100 mole percent of isophthalic acid, terephthalic acid or mixture thereof, or with an amide-forming derivative of isophthalic acid, of terephthalic acid, or of mixture thereof, and 0 to 50 mole percent of a dicarboxylic acid of formula V $$HOOC-(CH_2)_n COOH \qquad (V)$$

or an amide-forming derivative thereof, wherein $R_1$ to $R_4$, m and n have the meanings given in claim 1.

8. A shaped article comprising a polyamide according to claim 1.

* * * * *